United States Patent
Trimmer et al.

(10) Patent No.: US 12,320,029 B2
(45) Date of Patent: Jun. 3, 2025

(54) METHODS AND SYSTEMS OF ELECTROCHEMICAL MACHINING

(71) Applicant: General Electric Company, Schenectady, NY (US)

(72) Inventors: Andrew Lee Trimmer, Niskayuna, NY (US); John Malott Cottrill, Franklin, OH (US)

(73) Assignee: General Electric Company, Evendale, OH (US)

( * ) Notice: Subject to any disclaimer, the term of this patent is extended or adjusted under 35 U.S.C. 154(b) by 282 days.

(21) Appl. No.: 17/843,254

(22) Filed: Jun. 17, 2022

(65) Prior Publication Data
US 2023/0407516 A1    Dec. 21, 2023

(51) Int. Cl.
| | |
|---|---|
| C25F 3/14 | (2006.01) |
| B23H 3/02 | (2006.01) |
| B23H 3/04 | (2006.01) |
| C25F 3/08 | (2006.01) |

(52) U.S. Cl.
CPC ................. *C25F 3/14* (2013.01); *B23H 3/02* (2013.01); *B23H 3/04* (2013.01); *C25F 3/08* (2013.01)

(58) Field of Classification Search
CPC .................................... B23H 3/04; B23H 3/02
See application file for complete search history.

(56) References Cited

U.S. PATENT DOCUMENTS

| | | |
|---|---|---|
| 3,062,192 A | 11/1962 | Webb |
| 3,252,882 A | 5/1966 | Williams |
| 3,271,291 A | 9/1966 | Howard et al. |

(Continued)

FOREIGN PATENT DOCUMENTS

| | | |
|---|---|---|
| CN | 10365884 B | 4/2016 |
| DE | 102019216048 | 4/2021 |

(Continued)

OTHER PUBLICATIONS

Bhattacharyya et al., Electrochemical Machining: New Possibilities for Micromachining, Robotics and Computer-Integrated Manufacturing, vol. 18, Issues 3-4, 2002, pp. 283-289.

(Continued)

*Primary Examiner* — Brian W Cohen
(74) *Attorney, Agent, or Firm* — Fitch, Even, Tabin & Flannery LLP

(57) ABSTRACT

Methods and systems of electrochemically machining are provided. The methods may include applying a first potential to a tool electrode of an electrochemical machining system to generate a primary electric field. The electrochemical machining system may include a workpiece opposite the tool electrode, at least one bias electrode, and at least one fluid delivery channel within the at least one bias electrode. The method may further include applying at least one second potential to the at least one bias electrode. The method may further include delivering a charged electrolyte solution through the at least one fluid delivery channel into the electrolyte solution. Applying at least one second potential and the delivering the charged electrolyte solution generates at least one secondary electric field adjacent to the primary electric field and quenches at least one location of the primary electric field.

15 Claims, 5 Drawing Sheets

(56) References Cited

U.S. PATENT DOCUMENTS

| | | | |
|---|---|---|---|
| 3,357,906 | A | 12/1967 | Jollis et al. |
| 3,372,099 | A | 3/1968 | Clifford |
| 3,430,851 | A | 3/1969 | Abt |
| 3,616,346 | A | 10/1971 | Inoue |
| 3,654,116 | A | 4/1972 | Inoue |
| 3,975,245 | A | 8/1976 | Bergquist et al. |
| 4,026,779 | A | 5/1977 | Shaw |
| 4,052,284 | A | 10/1977 | Schrader |
| 4,336,122 | A | 6/1982 | Spirig |
| 4,522,692 | A | 6/1985 | Joslin |
| 4,851,090 | A | 7/1989 | Bruns et al. |
| 5,114,548 | A | 5/1992 | Rhoades |
| 5,310,468 | A | 5/1994 | Bruns et al. |
| 5,314,598 | A | 5/1994 | Glew |
| 5,714,054 | A | 2/1998 | Frembgen |
| 5,882,491 | A | 3/1999 | Wardle |
| 6,203,684 | B1 | 3/2001 | Taylor et al. |
| 6,231,692 | B1 | 5/2001 | Vogt et al. |
| 6,319,384 | B1 | 11/2001 | Taylor et al. |
| 6,402,931 | B1 | 6/2002 | Zhou et al. |
| 6,489,582 | B1 | 12/2002 | Roedl et al. |
| 6,558,231 | B1 | 5/2003 | Taylor |
| 6,624,377 | B2 | 9/2003 | Gianchandani et al. |
| 6,723,223 | B2 | 4/2004 | Zaitsev et al. |
| 6,946,062 | B2 | 9/2005 | Lin et al. |
| 7,356,122 | B2 | 4/2008 | Raber et al. |
| 7,394,040 | B2 | 7/2008 | Wei et al. |
| 7,741,576 | B2 | 6/2010 | Trimmer et al. |
| 7,867,374 | B2 | 1/2011 | Zdeblick et al. |
| 7,976,694 | B2 | 7/2011 | Trimmer et al. |
| 8,262,897 | B2 | 9/2012 | Bayer et al. |
| 8,506,770 | B2 | 8/2013 | Kiesel et al. |
| 8,742,279 | B2 | 6/2014 | Gannelli et al. |
| 8,801,906 | B2 | 8/2014 | Platz et al. |
| 8,906,221 | B2 | 12/2014 | Holmes et al. |
| 8,974,656 | B2 | 3/2015 | Trimmer et al. |
| 9,925,609 | B2 | 3/2018 | Trimmer et al. |
| 9,943,921 | B2 | 4/2018 | Trimmer et al. |
| 10,480,094 | B2 * | 11/2019 | Konopka ............ C25D 5/18 |
| 10,487,416 | B2 | 11/2019 | Trimmer et al. |
| 10,493,549 | B2 | 12/2019 | Clark et al. |
| 10,507,540 | B2 | 12/2019 | Lecomte et al. |
| 10,556,280 | B2 | 2/2020 | Trimmer et al. |
| 2002/0033341 | A1 | 3/2002 | Taylor et al. |
| 2003/0024825 | A1 | 2/2003 | Lamphere et al. |
| 2005/0098445 | A1 | 5/2005 | Batzinger et al. |
| 2005/0145508 | A1 | 7/2005 | Larsen et al. |
| 2006/0070887 | A1 | 4/2006 | Zdeblick |
| 2006/0124474 | A1 | 6/2006 | Tsai |
| 2006/0257244 | A1 | 11/2006 | Steplewski et al. |
| 2007/0264566 | A1 | 11/2007 | Arndt et al. |
| 2009/0008265 | A1 | 1/2009 | Bayer et al. |
| 2011/0303553 | A1 | 12/2011 | Inman et al. |
| 2012/0211357 | A1 | 8/2012 | Trimmer et al. |
| 2013/0193112 | A1 | 8/2013 | Murai et al. |
| 2016/0031026 | A1 | 2/2016 | Taylor et al. |
| 2016/0045968 | A1 | 2/2016 | Keller et al. |
| 2016/0256945 | A1 | 9/2016 | Goto et al. |
| 2016/0362810 | A1 | 12/2016 | Trimmer et al. |
| 2017/0087655 | A1 | 3/2017 | Bonini |
| 2017/0239741 | A1 | 8/2017 | Furuta |
| 2018/0169112 | A1 | 6/2018 | Schmidt |
| 2019/0210130 | A1 | 7/2019 | Bittner et al. |
| 2023/0066556 | A1 * | 3/2023 | Herrington ............ C23C 18/204 |
| 2023/0407517 | A1 | 12/2023 | Trimmer |

FOREIGN PATENT DOCUMENTS

| | | |
|---|---|---|
| EP | 0680801 A1 | 11/1995 |
| EP | 0767026 A1 | 4/1997 |
| GB | 1081902 A | 9/1967 |
| JP | 49037016 | 10/1974 |
| JP | 59219120 | 12/1984 |
| JP | H0691431 A | 4/1994 |
| JP | 07314258 | 12/1995 |
| JP | H10511610 | 11/1998 |
| JP | 2006523951 | 10/2006 |
| JP | 2008514823 | 5/2008 |
| JP | 2010058192 | 3/2010 |
| WO | WO2006111345 A1 | 10/2006 |
| WO | 2013156205 | 10/2013 |
| WO | WO2018104339 A1 | 6/2018 |
| WO | 2021242457 | 12/2021 |

OTHER PUBLICATIONS

Guodong et al., Selection and Optimization of Electrolyte for Micro Electrochemical Machining on Stainless Steel 304, Procedia CIRP, vol. 42, 2016, pp. 412-417.

Hongyou et al., Research on Technique of Pulse Electrochemical Surface Finishing, International Conference on Measuring Technology and Mechatronics Automation, vol. 2, Zhangjiajie Hunan, Apr. 11-12, 2009, pp. 677-680.

Inman et al., Electropolishing of Passive Materials in HF-Free Low Viscosity Aqueous Electrolytes, Journal of Electrochemical Society, vol. 160, Issue 9, 2013, pp. E94-E98.

Li et al., Cathode Design of Aero-Engine Blades in Electrochemical Machining Based on Characteristics of Electric and Electrolyte Flow Field, Proceedings of the IEEE International Conference on Automation and Logistics, Qingdao, China, Sep. 2008, pp. 1469-1473.

Sabareesaan et al., Evaluation of Process Parameter Ranks in Electric Discharge Machining of Aerospace Super Alloy Using Copper Electrode, 2014 2nd International Conference on Current Trends in Engineering and Technology (ICCTET), Coimbatore, Jul. 8, 2014, pp. 556-560.

Taylor et al., Electrochemical Surface Finishing, The Electrochemical Society Interface, Fall 2014, pp. 57-61.

Taylor et al., A Pulse/Pulse Reverse Electrolytic Approach to Electropolishing and Through-Mask Electroetching, Products Finishing, Sep. 26, 2011.

U.S. Appl. No. 17/843,286; filed Jun. 17, 2022, entitled "Methods and Systems of Electrochemical Machining".

U.S. Appl. No. 17/843,286; Notice of Allowance and Fees Due (PTOL-85) mailed Mar. 13, 2025; (pp. 1-10).

U.S. Appl. No. 17/843,286; Notice of Allowance and Fees Due (PTOL-85) mailed Mar. 26, 2025; (pp. 1-7).

* cited by examiner

METHODS AND SYSTEMS OF ELECTROCHEMICAL MACHINING

FIELD OF TECHNOLOGY

The field of the disclosure generally relates to electrochemical machining, and more particularly, to methods and systems for performing electrochemical machining.

BACKGROUND

Electrochemical machining (ECM) is a process of removing electrically conductive material, such as metallic materials, by an electrochemical process. It is typically used for machining (including working or finishing) a workpiece composed of an electrically conductive material. ECM generally provides desired shape control and a smooth surface finish for manufacturing components including, for example, bladed disks and other components of gas turbines, jet engines, and power generation.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
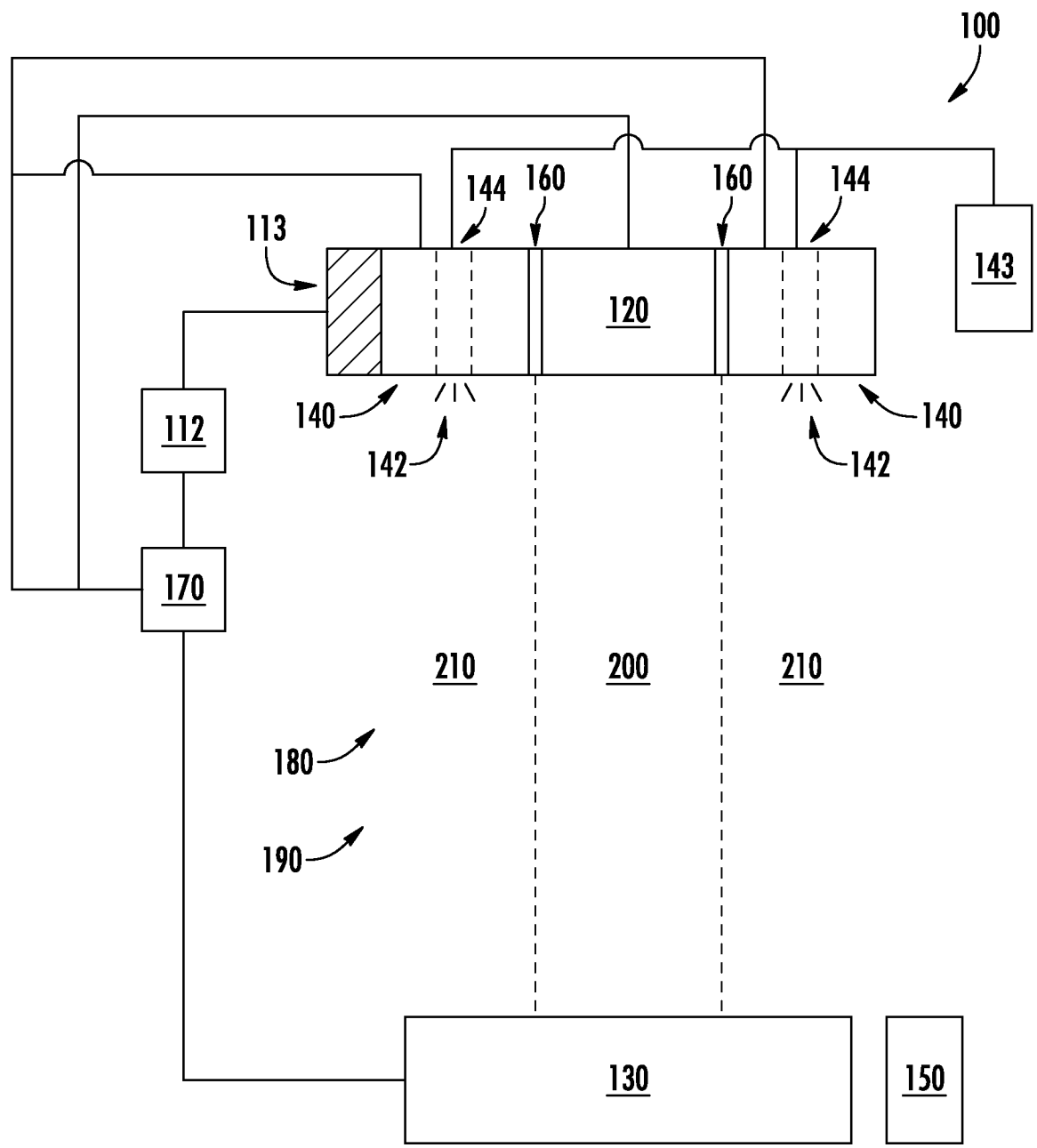
FIG. 1 shows a schematic view of an exemplary electrochemical machining system including a tool electrode and at least one bias electrode.

Repeat use of reference characters in the present specification and drawings is intended to represent the same or analogous features or elements of the present disclosure.

DETAILED DESCRIPTION

Reference now will be made in detail to embodiments of the disclosure, at least one examples of which are illustrated in the drawings. Each example is provided by way of explanation of the disclosure, not limitation of the disclosure. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "coupled," "fixed," "attached to," and the like refer to both direct coupling, fixing, or attaching, as well as indirect coupling, fixing, or attaching through at least one intermediate components or features, unless otherwise specified herein.

As used herein, the terms "first", "second", and "third" may be used interchangeably to distinguish one component from another and are not intended to signify location or importance of the individual components.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the term "quench" refers to a potential gradient within a particular area of an electric field that is below the standard potential that would enable electrochemical oxidation of a workpiece. As used herein, the term "location" refers to the particular area of the electric field that is quenched. The strength of an electric field cannot be measured directly, but the effects of increasing or decreasing the strength of an electric field within a particular location of the electric field may be readily observed as described herein, enabling a person to determine whether the electric field is quenched within a particular location.

As used herein, the term "stray current attack" refers to the oxidation of a finished component, that has already undergone electrochemical machining, adjacent to a workpiece during the ECM of the workpiece. Stray current attack is determined to have occurred when there is evidence that the adjacent, finished component has undergone additional material removal and surface pitting as a result of the ECM of the workpiece.

During ECM processes, electrically conductive material is oxidized from a workpiece using a potential applied to a tool electrode opposite of the workpiece, allowing a current to flow through an electrolyte solution provided between the tool electrode and the workpiece at a controlled rate. The workpiece serves as an anode and is separated by an electrode gap from a tool electrode, which serves as a cathode. The electrolyte solution, usually a salt solution in water, flows through the electrode gap, flushing away the oxidized material from the workpiece. As the tool electrode moves towards the workpiece to maintain a controlled electrode gap, the workpiece is machined into the complementary shape of the tool electrode.

ECM is particularly useful for metals and alloys that have a high hardness, making them difficult to machine with conventional methods. For example, nickel-based alloys may be machined using ECM to manufacture a variety of components, such as bladed disks. When manufacturing bladed disks using ECM, each airfoil is electrochemically machined onto the bladed disk one at a time. Specifically, once a single, finished airfoil is electrochemically machined onto the bladed disk, the bladed disk is rotated to conduct ECM of the next airfoil at a site adjacent to the finished airfoil. This process is repeated until the bladed disk has the desired number of airfoils.

However, manufacturing bladed disks with ECM has proven difficult when using more complex metals and alloys, such as titanium-based alloys. Specifically, when machining bladed disks with more complex alloys using ECM, stray current tends to travel from the area of the airfoil being machined to the adjacent, previously finished airfoils on the bladed disk. The stray current may damage the smooth surface finishes of the previously finished airfoils, resulting in a bladed disk containing airfoils that have a non-conforming geometry or finish and compromising part performance. This observation of stray current attack is not limited to the ECM of compressor bladed disks and can generally be observed in any ECM application where a component has closely-spaced features and when complex metals or alloys are employed.

A need exists, therefore, for quenching the primary electric field generated by the ECM process in strategic locations to combat the stray current attack of finished components adjacent to the workpiece.

Aspects of the present disclosure provide an ECM process for preventing the stray current attack of a finished component adjacent to the workpiece. The ECM process generally involves selectively quenching locations of a primary electric field, which is generated between a tool electrode and a workpiece. The locations of the primary electric field may be selectively quenched using a combination of bias anode protection and charged electrolyte delivery. Selectively quenching locations of the primary electric field minimizes the stray current attack and rate of oxidation of the finished component adjacent to the workpiece, which has already undergone ECM. In this regard, the methods and systems described herein utilize a combination of bias anode protection and charged electrolyte flow, which can be used in an electrochemical machining system, to strategically alter the electric field generated during ECM at at least one location within the electrolyte solution to combat the stray current attack of the finished component adjacent to the workpiece. The aspects of the present disclosure more effectively manage stray currents and have the ability to control geometry of workpieces more precisely.

Figure 2:
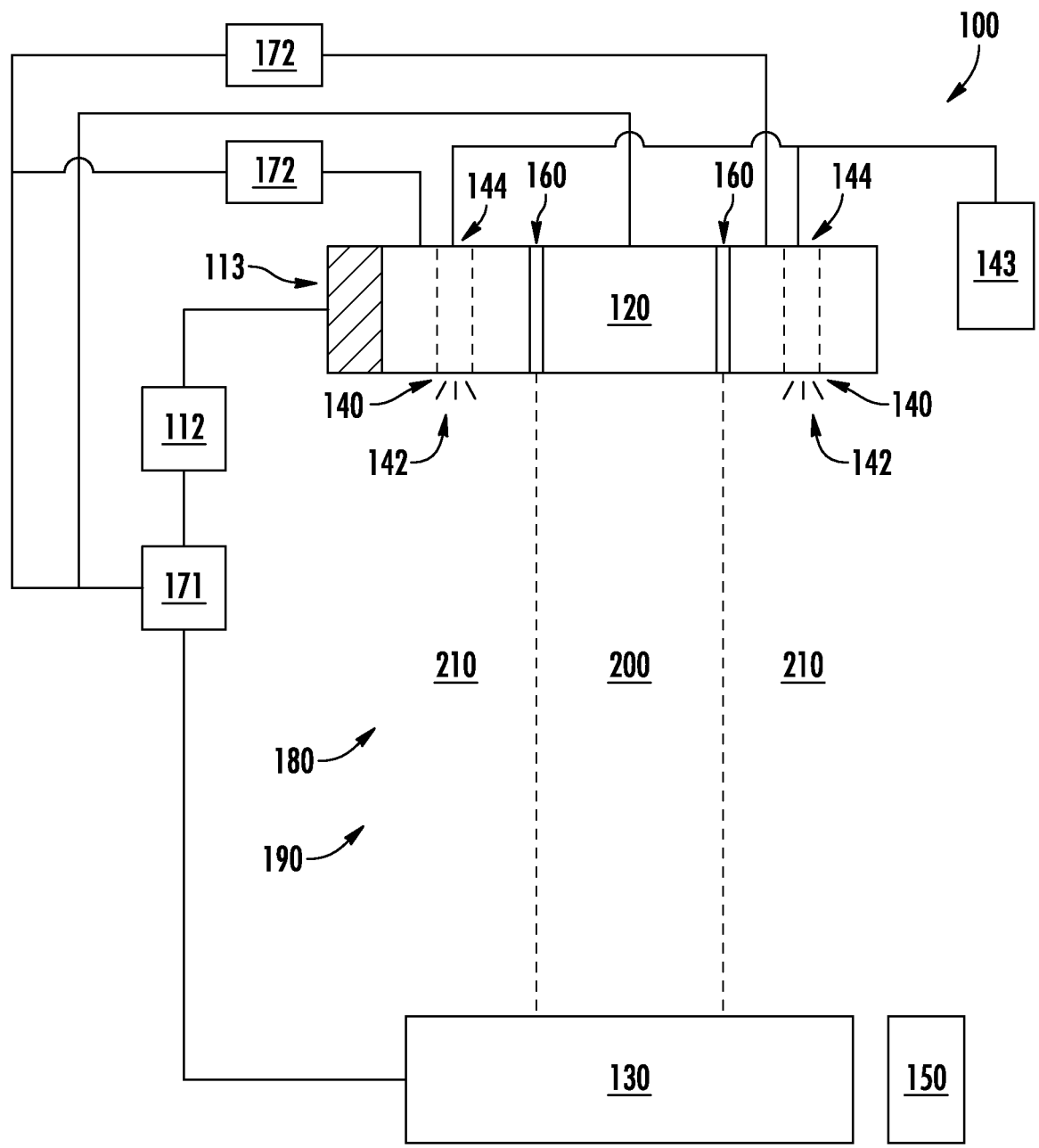
FIG. 2 shows a schematic view of another exemplary electrochemical machining system according to the present disclosure.

Referring now to the drawings, each of FIGS. 1 and 2 show a schematic view of an exemplary electrochemical machining system 100 including a tool electrode 120 and at least one bias electrode 140. Specifically, the electrochemical machining system 100 includes a tool electrode 120 configured to generate a primary electric field 200 between the tool electrode 120 and a workpiece 130 opposite the tool electrode 120. The at least one bias electrode 140 is positioned adjacent to the tool electrode 120. Each at least one bias electrode 140 includes at least one fluid delivery channel 144. The at least one bias electrode 140 is configured to generate at least one secondary electric field 210 adjacent to the primary electric field 200.

In one embodiment, the at least one bias electrode 140 is strategically positioned in regions of the electrochemical machining system 100 where stray current attack is anticipated. For instance, in the exemplary embodiment of FIGS. 1 and 2, stray current attack may be anticipated on the finished component 150, which is adjacent the workpiece 130, during ECM operation. Specifically, in the absence of the bias anode protection and charged electrolyte delivery of the present disclosure, it would be anticipated that the primary electric field 200 generated between the tool electrode 120 and the workpiece 130 would only be bound by the area in which the primary electric field 200 would naturally dissipate, allowing stray current to freely travel from the primary electric field 200 to the finished component 150 if naturally capable. Thus, in the exemplary embodiments as shown in FIGS. 1 and 2, the at least one bias electrode 140 is preferably positioned adjacent to the tool electrode 120 and at a position opposite the workpiece 130 such that a charged electrolyte solution 142 can be delivered through the at least one fluid delivery channel 144 into the electrode gap 180 of the electrochemical machining system 100 via at least one nozzle 141 of the at least one bias electrode 140. Thus, the at least one bias electrode 140 inhibits the stray current attack of a finished component 150 adjacent to a workpiece 130.

The workpiece 130 and the at least one bias electrode 140 may include any metal material that is suitable for ECM. In one embodiment, the workpiece 130 and the at least one bias electrode 140 may each include metal materials that are unique from one another. Alternatively, the workpiece 130 and the at least one bias electrode 140 may include metal materials that are the same as each other.

For instance, in one embodiment, the workpiece 130 and the at least one bias electrode 140 may include a metal material. In a further embodiment, the metal material may include a pure metal or a metal alloy. Pure metals may include titanium, niobium, nickel, zirconium, palladium, platinum, aluminum, chromium, manganese, cobalt, molybdenum, hafnium, tungsten, or a combination thereof. Alloys may include superalloys, such as a titanium-based alloy, niobium-based alloy, nickel-based alloy, zirconium-based alloy, palladium-based alloy, platinum-based alloy, aluminum-based alloy, chromium-based alloy, manganese-based alloy, cobalt-based alloy, molybdenum-based alloy, hafnium-based alloy, tungsten-based alloy, or a combination thereof. However, other metal materials may be employed.

As shown in FIGS. 1 and 2, the exemplary electrochemical machining system 100 includes at least one spacer 160, the at least one spacer 160 being positioned in between the at least one bias electrode 140 and the tool electrode 120. The at least one spacer contains a nonconductive material, which electrically isolates the tool electrode 120 from the at least one bias electrode 140. Thus, at least one secondary electric field 210 may be generated adjacent to the primary electric field 200. For example, the at least one spacer 160 may contain a fiberglass reinforced nonconductive material, such as a fluoropolymer.

In one embodiment, the at least one spacer 160 may have a thickness of 100 micrometers to 2500 micrometers, such as from 350 micrometers to 2000 micrometers, such as from 500 micrometers to 1500 micrometers. In one embodiment, the at least one spacer 160 may have a thickness of 750 micrometers to 1000 micrometers.

The workpiece 130 is separated from the tool electrode 120 by an electrode gap 180, in which an electrolyte solution 190 is interspaced in between the tool electrode 120 and the workpiece 130. The electrode gap 180 can be varied by moving the tool electrode 120, the workpiece 130, or a combination thereof.

The workpiece 130, the tool electrode 120, and the at least one bias electrode 140 of the electrochemical machining system 100 may be electrically connected in at least one electrical circuit. In an exemplary embodiment, as shown in FIG. 1, the workpiece 130, the tool electrode 120, and the at least one bias electrode 140 are electrically connected in one circuit. Further, each of the workpiece 130, the tool electrode 120, and the at least one bias electrode 140 may be electrically connected to each other in series or in parallel. In an exemplary embodiment, as shown in FIG. 1, the electrochemical machining system 100 includes at least one bias electrode 140 that is electrically connected in series with the tool electrode 120 and the workpiece 130. In one embodiment, as shown in FIG. 1, the electrochemical machining system may include a single power supply 170. Alternatively, as shown in FIG. 2, which shows a front schematic view of another exemplary electrochemical machining system 100, the electrochemical machining system 100 may be electrically connected to a first power supply 171 and at least one second power supply 172.

Referring to FIGS. 1 and 2, the electrochemical machining system 100 further includes an electrolyte supply 143 configured to deliver a charged electrolyte solution 142 to the at least one fluid delivery channel 144. The electrolyte supply 143 may contain electrolyte solution and be in fluid communication with the at least one bias electrode 140. The electrolyte supply 143 may feed electrolyte solution to the at least one bias electrode 140 using any suitable means know in the art. For instance, a conventional pump (not shown) may me employed to move electrolyte solution from the electrolyte supply 143 to the at least one bias electrode 140.

The charged electrolyte solution 142, along with the electrolyte solution 190 in the electrode gap 180, may include any suitable electrolyte, such as a base, an acid, or an ionic liquid. In some embodiments, the electrolyte solution 190 includes ionic salts, binary acids, organic acids, deep eutectics, molten salts, or combinations thereof. The charged electrolyte solution 142, electrolyte solution 190 or both may be an aqueous electrolyte, such as an aqueous salt electrolyte including water and at least one salt. In one embodiment, the charged electrolyte solution 142, electrolyte solution 190 or both may include an aqueous salt electrolyte, which includes sodium nitrate, sodium chloride, sodium bromide, sodium hydroxide, perchloric acid, phosphoric acid, or a combination thereof. In some embodiments, the charged electrolyte solution 142, electrolyte solution 190 or both may constitute 10 percent sodium nitrate (by weight) to 30 percent sodium nitrate (by weight). For example, an electrolyte solution constituting 20 percent sodium nitrate (by weight) may be used for electrochemically machining nickel-based alloys such as Inconel 718. Additionally, the charged electrolyte solution 142, electrolyte solution 190 or both is generally pH adjusted depending on the material being electrochemically machined. For instance, the electrolyte may be pH adjusted to have a pH from 5 to 10. It will be appreciated that other aqueous solution electrolytes may be employed with the techniques of the present disclosure.

As shown in FIGS. 1-2, the electrochemical machining system 100 may further include a controller 112, a power supply 170, and an actuator 113. The controller 112 may be operably connected to the power supply 170 for adjusting the voltages of the first potential and the at least one second potential as desired. The controller 112 may further be operably connected to the actuator 113 for adjusting the position of the tool electrode 120 and/or the workpiece 130 during the ECM process. As used herein, the phrase "operatively connected" should be understood to mean that the respective components may be connected (for example, mechanically or electrically) directly or may be connected via other components.

The controller 112 and power supply 170 may be a combined unit, although shown as a separate unit in FIG. 1. Further, in some embodiments, the controller 112 can be configured and function in the same or similar manner as one of the computing devices 402 of the computing system 400 of FIG. 4.

Figure 3:
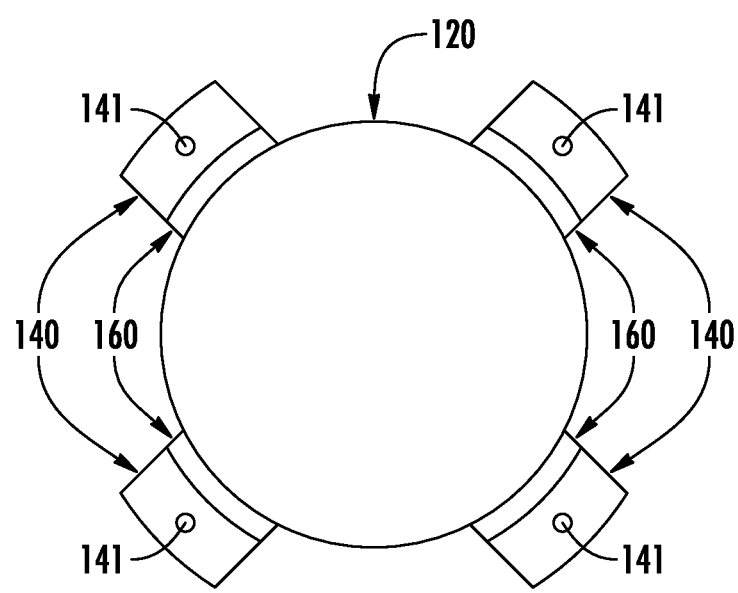
FIG. 3 shows a bottom perspective view of the tool electrode and the at least one bias electrode of FIG. 1.

Referring now to FIG. 3, which shows a bottom perspective view of the tool electrode 120 and the at least one bias electrode 140 of FIGS. 1 and 2, the at least one bias electrode 140 may be positioned with respect to the tool electrode 120 in a variety of ways. For instance, as shown in FIG. 3, the bottom face of the tool electrode 120 may have a generally circular shape, with each at least one bias electrode 140 positioned equidistant from each other, radially, surrounding the tool electrode 120. However, other configurations may be employed as desired, as the configuration of the tool electrode 120 and at least one bias electrode 140 depend on at least the shape of the workpiece 130 and the location at which stray current attack is intended to be minimized.

Figure 4:
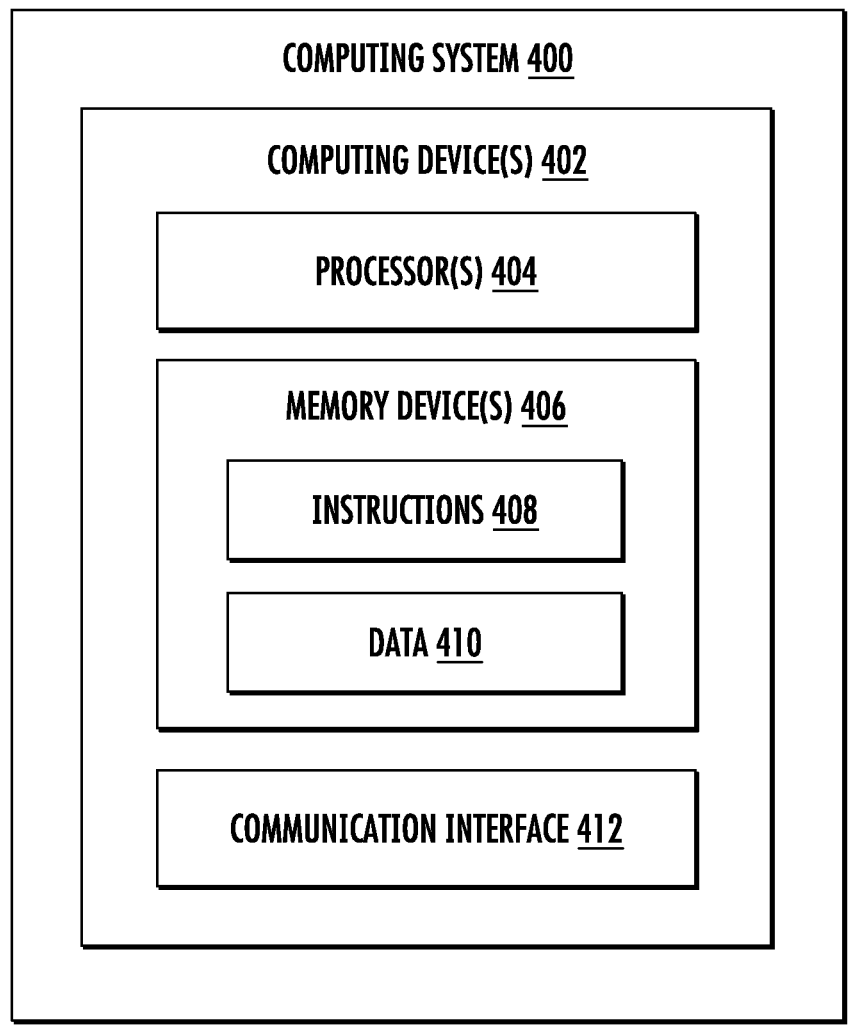
FIG. 4 shows a schematic view of a computing system including computing devices, in which one of the computing devices may function the same or similar to a controller of the present disclosure.

FIG. 4 provides an example computing system 400 in accordance with an example embodiment of the present subject matter. The controller 112 described herein can include various components and perform various functions of the at least one computing devices 402 of the computing system 400 described below.

As shown in FIG. 4, the computing system 400 can include at least one computing device(s) 402. The computing device(s) 402 can include at least one processor(s) 404 and at least one memory device(s) 406. The at least one processor(s) 404 can include any suitable processing device, such as a microprocessor, microcontroller, integrated circuit, logic device, and/or other suitable processing device. The at least one memory device(s) 406 can include at least one computer-readable media, including, but not limited to, non-transitory computer-readable media, RAM, ROM, hard drives, flash drives, and/or other memory devices.

The at least one memory device(s) 406 can store information accessible by the at least one processor(s) 404, including computer-readable instructions 408 that can be executed by the at least one processor(s) 404. The instructions 408 can be any set of instructions that when executed by the at least one processor(s) 404, cause the at least one processor(s) 404 to perform operations, such as any of the operations described herein. For instance, the methods provided herein can be implemented in whole or in part by the computing system 400. The instructions 408 can be software written in any suitable programming language or can be implemented in hardware. Additionally, and/or alternatively, the instructions 408 can be executed in logically and/or virtually separate threads on processor(s) 404. The memory device(s) 406 can further store data 410 that can be accessed by the processor(s) 404. For example, the data 410 can include models, databases, etc.

The computing device(s) 402 can also include a network interface 412 used to communicate, for example, with the other components of the electrochemical machining system 100 (e.g., via a network). The network interface 412 can include any suitable components for interfacing with at least one network(s), including for example, transmitters, receivers, ports, antennas, and/or other suitable components.

Figure 5:
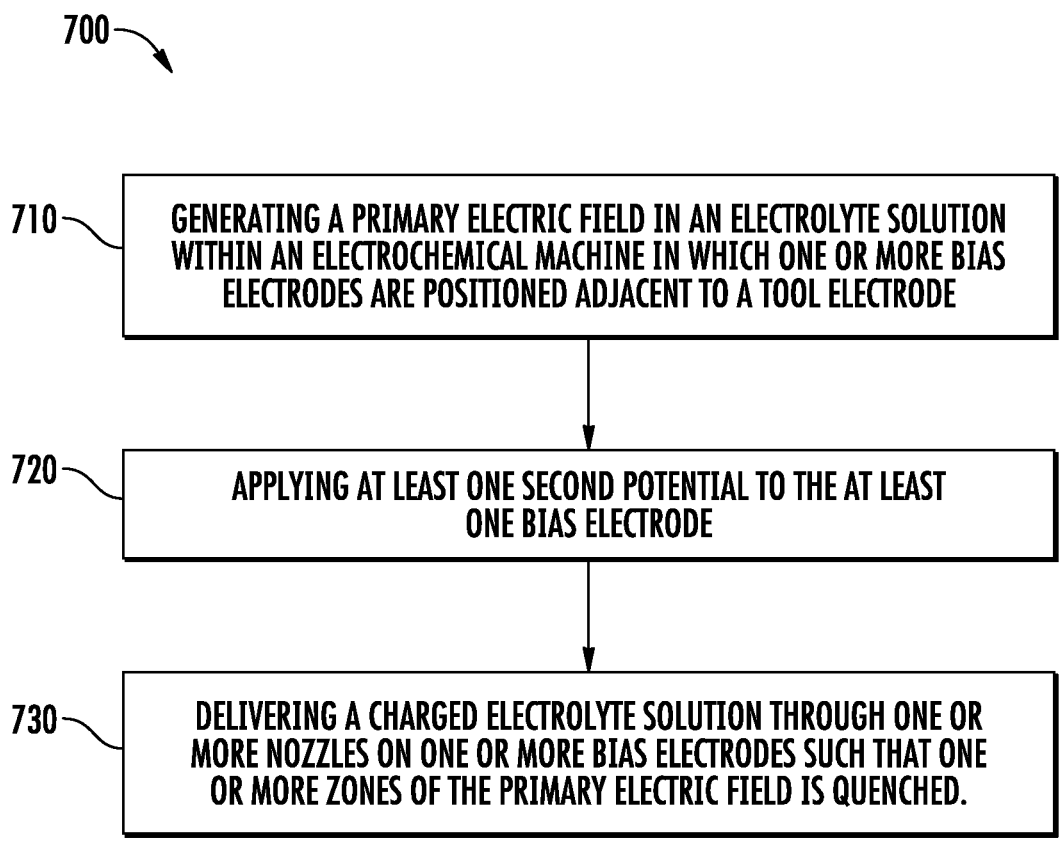
FIG. 5 shows a flow chart diagram of a method of electrochemical machining according to the present disclosure.

In another embodiment, a method 700 of electrochemically machining a workpiece is generally provided as shown in the flow chart diagram of FIG. 5. The method includes applying a first potential to a tool electrode of an electrochemical machining system to generate a primary electric field 710. The electrochemical machining system includes a workpiece opposite the tool electrode, at least one bias electrode, and at least one fluid delivery channel within the at least one bias electrode. The primary electric field is generated within an electrolyte solution between the tool electrode and the workpiece. The method further includes applying at least one second potential to the at least one bias electrode 720. The method further includes delivering a charged electrolyte solution through the at least one fluid delivery channel into the electrolyte solution 730, Applying at least one second potential and the delivering the charged electrolyte solution generates at least one secondary electric field adjacent to the primary electric field and quenches at least one location of the primary electric field. Bias anode protection works in combination with charged electrolyte delivery to create a robust operation to electrochemically machine complex geometries using difficult to machine materials, while combating the stray current attack of adjacent, finished surfaces.

In certain embodiments, delivering charged electrolyte solution through the at least one fluid delivery channel within the at least one bias electrode, in combination with applying at least one second potential to the at least one bias electrode, provides the ability to locally alter the primary electric field and affect the rate at which local materials oxidize, including the workpiece and the adjacent finished component. In particular embodiments, the strategic placement of the at least one bias electrode, in combination with charged electrolyte delivery through the at least one fluid channel, allows for the primary electric field to be quenched in strategic locations and be generally bound to the actual site of electrochemical machining. As such, a method of more precisely controlling the primary electric field is generally provided to combat the stray current attack of the primary electric field on an adjacent finished component.

During operation, the workpiece 130 may act as an anode and the tool electrode 120 may act as a cathode, generating the primary electric field 200 in between the workpiece 130 and the tool electrode 120. Additionally, the at least one bias electrode 140 may act as an anode and the tool electrode 120 may act as a cathode, generating at least one secondary electric field 210 adjacent to the primary electric field 200 between each at least one bias electrode 140 and the tool electrode 120.

As discussed, a single power supply 170 may be electrically connected to the electrochemical machining system 100. In one embodiment, the method may include using the single power supply 170 to apply the first potential and the at least one second potential to the electrochemical machining system 100.

Moreover, in another embodiment, the method may include using a first power supply 171 to apply a first potential to the electrochemical machining system 100 and using at least one second power supply 172 to apply at least one second potential to the electrochemical machining system 100. Applying the first potential to the electrochemical machining system 100 may generate the primary electric field 200, while applying the at least one second potential to the electrochemical machining system 100 may generate the at least one secondary electric field 210 adjacent to the primary electric field 200.

Each at least one second potential may be a unique voltage from each other. That is, the at least one second potential may include two or more second potentials that are unique voltages from each other. This provides for the precise control of the oxidation of the workpiece 130 at selective locations on the workpiece 130, as each at least one secondary electric field 210 may be generated to remove material from the workpiece 130 at a unique rate of oxidation. Alternatively, at least two or more of the second potentials may be the same voltage.

In one embodiment, the first potential applied to the electrochemical machining system 100 may be a first DC potential of 5 volts to 50 volts, such as from volts to 35 volts. In one embodiment, the at least one second potential applied to the electrochemical machining system 100 may be at least one second DC potentials of 1volts to 50 volts, such as from 1 volts to 35 volts, such as from 1 volt to 10 volts.

In one embodiment, the method may include applying the first potential to the electrochemical machining system 100, in which the first potential is a first pulsed potential. Similarly, the method may include applying at least one second potential to the electrochemical machining system 100, in which the at least one second potential applied to the electrochemical machining system 100 is at least one second pulsed potential. Specifically, the power supply 170 may be configured to provide the first pulsed potential, the at least one second pulsed potential, or a combination thereof in the form of a pulsed potentials (and more particularly, a bipolar pulsed potentials). In one embodiment, the application of the first pulsed potential to the tool electrode 120 electrochemically removes a predetermined amount of material from the workpiece 130, while the application of at least one second pulsed potential to the at least one bias electrode 140 generates the at least one secondary electric field 210.

As used herein, the term "average potential" is an average of the off-time potential and the on-time potential of each pulsed potential. In some embodiments, the average potential of the first pulsed potential may be in a range or from 1 volt to 5 volts. Additionally, the average potential of the at least one second pulsed potential may be a range of 1 to 5 volts.

In one embodiment, the power supply 170 may include a bipolar power source and may be configured to perform pulse train control. In another embodiment, the controller 112 may be configured to adjust the pulse duration, frequency and voltage of the first pulsed potential applied to tool electrode 120 and the workpiece 130 the second pulsed potential applied to the tool electrode 120 and the at least one bias electrode 140 as desired.

For instance, the pulse durations of the first pulsed potential, the at least one second pulsed potential, or a combination thereof may be from 10 nanoseconds to 1000 microseconds, such as from 10 nanoseconds to 50 microseconds. Additionally, in one embodiment, the voltage applied to the first pulsed potential, the at least one second pulsed potential, or a combination thereof may be from 10 volts to 50 volts, such as from 15 volts to 25 volts.

Further, in some embodiments, the method includes controlling the distance between the tool electrode 120 and the workpiece 130 (i.e., the length of the electrode gap 180) to be greater than 0.05 millimeters, such as greater than 0.1 millimeter. In some embodiments, the method includes controlling the distance between the tool electrode 120 and the workpiece 130 to be from 0.1 millimeter to 2 millimeters, such as from 0.5 millimeters to 1.5 millimeters.

In one embodiment, the method includes a delivering a charged electrolyte solution through the at least one fluid delivery channel into the electrolyte solution 730. Specifically, a charged electrolyte solution is delivered through the at least one fluid delivery channel within the at least one bias electrode into the electrode gap from an electrolyte supply.

In an exemplary embodiment, a power supply may be electrically connected to the at least one bias electrode as electrolyte solution is delivered from the electrolyte supply to the at least one bias electrode. The electrolyte solution being transported from the electrolyte supply may be charged and transformed into the charged electrolyte solution by the at least one second potential being applied to the at least one bias electrode. In this regard, the charged electrolyte solution can be delivered through the at least one fluid delivery channel and exit out of the at least one bias electrode through at least one nozzle onto specific regions of workpiece, altering the primary electric field and combating the stray current attack of the finished component adjacent to the workpiece.

In an exemplary embodiment, the charged electrolyte solution exits the at least one nozzle 141 at a rate of 1 L/min to 50 L/min, such as from 1 L/min to 25 L/min, such as from 1 L/min to 10 L/min, such as from 1 L/min to 5 L/min.

In some instances, in combination with charged electrolyte delivery, the electrolyte solution 190 may be continuously forced though the electrode gap 180 to rinse the workpiece 130 and the tool electrodes 120 at a flowrate of 0.5 L/s to 20 L/s, such as from 3.75 L/s to 10 L/s. Additionally, the electrolyte solution 190 may be continuously forced through the electrode gap 180 at a pressure of 350,000 Pa to 3,500,000 Pa.

In particular embodiments, bias anode protection in combination with charged electrolyte delivery has been shown to exhibit a decreased amount of "stray current attack" on the surface of finished components adjacent to the workpiece being electrochemically machined. Evidence of a decreased amount of "stray current attack" on the adjacent, finished component 150 is illustrated by the decrease in the amount of additional material removal and surface pitting the finished component 150 undergoes during the electrochemical machining of the workpiece 130, as compared to electrochemically machining a workpiece 130 under the same conditions without bias anode protection and charged electrolyte delivery.

In one embodiment, delivering the charged electrolyte solution substantially decreases an oxidation rate of the finished component 150 adjacent to the workpiece 130. Similarly, the decrease in the rate of oxidation of the finished component 150 is illustrated by the decrease in the amount of additional material removal and surface pitting the finished component 150 undergoes during the electrochemical machining of the workpiece 130, as compared to electrochemically machining the workpiece 130 under the same conditions without bias anode protection and charged electrolyte delivery.

Accordingly, as described herein, the present subject matter provide for improved methods and systems of electrochemical machining. For instance, the current state of the art requires the manual, physical masking of finished components adjacent to a workpiece in order to protect their surfaces from stray current attack. Conversely, the combination of bias anode protection and charged electrolyte delivery as described by the present disclosure allow for the automated, closed-loop control of an electrochemical machine's primary electric field and the serial machining of a workpiece with adjacent, finished component nearby through an enhanced degree of protection from stray current attack, all without the need for manual masking. Specifically, bias anode protection in combination with charged electrolyte delivery as described herein provide for the selective quenching of particular locations in the primary electric field, ensuring the quality of adjacent, finished components even on parts having closely-spaced, complex features, such as bladed disks. Moreover, the systems and methods described herein may be retrofit to existing machines.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Further aspects of the disclosure are provided by the subject matter of the following clauses:

A method of electrochemically machining a workpiece, the method comprising: applying a first potential to a tool electrode of an electrochemical machining system to generate a primary electric field, wherein the electrochemical machining system comprises a workpiece opposite the tool electrode, at least one bias electrode, and at least one fluid delivery channel within the at least one bias electrode; wherein the primary electric field is generated within an electrolyte solution between the tool electrode and the workpiece; applying at least one second potential to the at least one bias electrode; and delivering a charged electrolyte solution through the at least one fluid delivery channel into the electrolyte solution, wherein the applying at least one second potential and the delivering the charged electrolyte solution generates at least one secondary electric field adjacent to the primary electric field and quenches at least one location of the primary electric field.

The method of any clause herein, wherein at least one spacer is positioned in between the at least one bias electrode and the tool electrode.

The method of any clause herein, wherein the at least one spacer has a thickness of 100 micrometers to 2500 micrometers.

The method of any clause herein, wherein the at least one bias electrode is electrically connected in series with the tool electrode and the workpiece.

The method of any clause herein, wherein the first potential is a direct current potential of 5 volts to 50 volts.

The method of any clause herein, wherein the at least one second potential is a direct current potential of 1 volt to 10 volts.

The method of any clause herein, wherein the first potential is a first pulsed potential and the at least one second potential is at least one second pulsed potential.

The method of any clause herein, wherein the first pulsed potential has an average potential of 1 volt to 5 volts.

The method of any clause herein, wherein the at least one second pulsed potential has an average potential of 1 volt to 5 volts.

The method of any clause herein, wherein the charged electrolyte solution is charged in the at least one fluid delivery channel by the at least one second potential.

The method of any clause herein, wherein the charged electrolyte solution exits at least one nozzle of the at least one electrode at a rate of 1 L/min to 50 L/min.

The method of any clause herein, wherein the workpiece and the at least one bias electrode comprise a metal material, the metal material comprising a metal alloy comprising a titanium-based alloy, niobium-based alloy, nickel-based alloy, zirconium-based alloy, palladium-based alloy, platinum-based alloy, aluminum-based alloy, chromium-based alloy, manganese-based alloy, cobalt-based alloy, molybdenum-based alloy, hafnium-based alloy, tungsten-based alloy, or a combination thereof.

The method of any clause herein, wherein the delivering the charged electrolyte solution substantially decreases an oxidation rate of a finished component adjacent to the workpiece.

The method of any clause herein, wherein the finished component is an airfoil.

The method of any clause herein, wherein the at least one second potential comprises two or more second potentials that are unique voltages from each other.

An electrochemical machining system, comprising: a tool electrode configured to generate a primary electric field between the tool electrode and a workpiece opposite the tool electrode; and at least one bias electrode positioned adjacent to the tool electrode, wherein the at least one bias electrode comprises at least one fluid delivery channel, the at least one bias electrode configured to generate at least one secondary electric field adjacent to the primary electric field.

The electrochemical machining system of any clause herein, wherein the at least one bias electrode is electrically connected in series with the tool electrode and the workpiece.

The electrochemical machining system of any clause herein, further comprising a power supply electrically connected to the at least one bias electrode and the tool electrode.

The electrochemical machining system of any clause herein, further comprising an electrolyte supply configured to deliver a charged electrolyte solution to the at least one fluid delivery channel.

The electrochemical machining system of any clause herein, wherein at least one spacer is positioned in between the at least one bias electrode and the tool electrode.

This written description uses exemplary embodiments to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of electrochemically machining a workpiece, the method comprising:
    applying a first potential to a tool electrode of an electrochemical machining system to generate a primary electric field, wherein the electrochemical machining system comprises a workpiece opposite the tool electrode, at least one bias electrode, and at least one fluid delivery channel within the at least one bias electrode; wherein the primary electric field is generated within an electrolyte solution between the tool electrode and the workpiece;
    applying at least one second potential to the at least one bias electrode; and
    delivering a charged electrolyte solution through the at least one fluid delivery channel into the electrolyte solution, wherein the applying at least one second potential and the delivering the charged electrolyte solution generates at least one secondary electric field adjacent to the primary electric field and quenches at least one location of the primary electric field.

2. The method of claim 1, wherein at least one spacer is positioned in between the at least one bias electrode and the tool electrode.

3. The method of claim 2, wherein the at least one spacer has a thickness of 100 micrometers to 2500 micrometers.

4. The method of claim 1, wherein the at least one bias electrode is electrically connected in series with the tool electrode and the workpiece.

5. The method of claim 1, wherein the first potential is a direct current potential of 5 volts to 50 volts.

6. The method of claim 1, wherein the at least one second potential is a direct current potential of 1 volt to 10 volts.

7. The method of claim 1, wherein the at least one second potential comprises two or more second potentials that are unique voltages from each other.

8. The method of claim 1, wherein the first potential is a first pulsed potential and the at least one second potential is at least one second pulsed potential.

9. The method of claim 8, wherein the first pulsed potential has an average potential of 1 volt to 5 volts.

10. The method of claim 8, wherein the at least one second pulsed potential has an average potential of 1 volt to 5 volts.

11. The method of claim 1, wherein the charged electrolyte solution is charged in the at least one fluid delivery channel by the at least one second potential.

12. The method of claim 1, wherein the charged electrolyte solution exits at least one nozzle of the at least one bias electrode at a rate of 1 L/min to 50 L/min.

13. The method of claim 1, wherein the workpiece and the at least one bias electrode comprise a metal material, the metal material comprising a metal alloy comprising a titanium-based alloy, niobium-based alloy, nickel-based alloy, zirconium-based alloy, palladium-based alloy, platinum-based alloy, aluminum-based alloy, chromium-based alloy, manganese-based alloy, cobalt-based alloy, molybdenum-based alloy, hafnium-based alloy, tungsten-based alloy, or a combination thereof.

14. The method of claim 1, wherein the delivering the charged electrolyte solution substantially decreases an oxidation rate of a finished component adjacent to the workpiece.

15. The method of claim 14, wherein the finished component is an airfoil.

* * * * *